Patented Nov. 19, 1940

2,222,345

UNITED STATES PATENT OFFICE 2,222,345

CHLORINE CONTAINING LACQUER RAW MATERIALS

Alfred Blömer, Wiembach, near Opladen, and Wilhelm Becker, Cologne-Mulheim, Germany, assignors to I. G. Farbenindustrie Aktiengesellschaft, Frankfort-on-the-Main, Germany No Drawing. Application August 13, 1938, Serial No. 224,730. In Germany August 14, 1937

8 Claims. (Cl. 260—32)

The present invention relates to new chlorine containing raw materials for the lacquer industry.

Natural rubber, if subjected to chlorination, is converted into a product which represents a valuable raw material for the preparation of lacquers. Also synthetic rubber as is obtained by the polymerization of butadienes has been subjected to chlorination. Thus, the earlier co-pending application Serial No. 202,445, Apr. 16, 1938 describes and claims the chlorination of a polymeric butadiene-1.3 in the presence of a solvent which is capable of dissolving the polymerizate as well as the resulting chlorination product. The final products thus obtained though being soluble in acetone and some other solvents do not meet all requirements of the lacquer industry. Thus, they show a too high viscosity even in solutions of low concentration; in consequence thereof, they are not very suited for the preparation of spraying lacquers and the like.

It is the object of our present invention to do away with these disadvantages and to develop a new process which allows one to obtain chlorination products of synthetic rubber-like materials which combine a good solubility with a low viscosity and with the other valuable properties of chlorinated rubber. With these and other objects in view our invention consists in the combination of the following steps:

We start from butadiene hydrocarbons such as butadiene-1.3 itself and isoprene or from mixtures of such hydrocarbons or from mixtures of one or two of such hydrocarbons with other polymerizable substances such as styrene, acrylic acid derivatives and the like. These polymerizable substances are subjected to a conjoint polymerization in aqueous emulsion, preferably with the addition of a polymerization accelerator such as an organic or inorganic peroxide. It is an essential feature of the present invention that the polymerization is effected in the presence of such substances as effect an increase of plasticity and solubility of the polymerizate. It is well known that many substances exert a pronounced retarding or regulating effect on the course of the polymerization of butadienes. Such compounds are described, for instance, in the French patent No. 686,934 and in the U. S. Patent No. 1,950,439 to Carothers et al., though the said patents described the heat polymerization alone. In the emulsion polymerization these additions merely exert a regulating effect (increase of plasticity and solubility) but no retarding effect. Particular importance is attached to sulfur containing compounds and among those to the compounds which are described in the earlier co-pending application Serial No. 193,060 to Meisenburg et al. filed February 28, 1938. The catalysts which are employed in the latter application are defined therein as "such organic sulfur containing compounds as are soluble in the butadiene". Examples for such regulators as have proved to be particularly suitable are diisopropylxanthogendisulfide and ditolyldisulfide. From the synthetic latices thus obtained the polymerizates are isolated in the usual manner, for instance, by acidification and/or by the addition of other electrolytes such as sodium chloride. After drying these products are dissolved in an indifferent solvent and then subjected to chlorination. The term "indifferent solvent" designates such solvents as are not materially attacked by chlorine. Examples for such solvents are carbon tetrachloride, chloroform, chlorobenzenes and aromatic hydrocarbons such as benzene itself. The chlorination products thus obtained exhibit the remarkable and unexpected properties that the viscosity of their solutions is inversely proportional to the amount of regulators which have been employed in the preparation of the emulsion polymerizates. In consequence thereof, we can regulate the viscosity of the solutions of chlorinated synthetic rubber solely by the amount of regulators which are employed in the preparation of the starting materials. This is the more surprising as in case of natural rubber the chlorination is accompanied by a remarkable disaggregation of the rubber so that there is no proportionality whatsover between the degree of disaggregation of the rubber and viscosity of the solutions of chlorinated rubber obtained therefrom.

As to the chlorination and the working up of the chlorinated products we usually employ the methods which have been developed in the chlorination of natural rubber. The isolation can be effected by pouring the solution into hot water the temperature of which is sufficiently high to cause evaporation of the solvent; furthermore, the solution can be continuously applied in a thin stream to heated rollers thereby evaporating the solvent. Prior to practical application the chlorination products are suitably subjected to an alkaline after treatment, if desired, at an elevated temperature, in order to remove any hydrochloric acid or chlorine which may mechanically adhere to the product or might be present therein in a loosely bound state. A permanent stability can be given to the chlorination product by the incorporation therewith of ethylene oxide derivatives such as phenoxypropeneoxide.

The following examples illustrate the present invention without, however, restricting it thereto the parts being by weight:

Example 1

100 parts of butadiene-1.3 are subjected to the emulsion polymerization in 150 parts of a 3.6 per cent solution of the sodium salt of diisobutylnaphthalene sulfonic acid while adding thereto 0.5 part of ammonium persulfate, 2 parts of diisopropylxanthogendisulfide and some sodium hydroxide so as to induce to the emulsion a slightly alkaline reaction. The emulsion is shaken for several days until about 80 per cent of the butadiene have been polymerized. Thereupon the polymeric butadiene is precipitated by means of a sodium chloride solution and dried. It is then dissolved in chloroform so as to obtain a 10% solution (by volume); this solution shows a relative viscosity of 16.5%. Chlorine is then introduced into the solution until the evolution of hydrogen chloride has ceased and the product does not take up any more chlorine. The solution is then worked up by pouring it into hot water or in methyl alcohol, the precipitating chlorinated synthetic rubber is stabilized by treating it with a dilute sodium carbonate solution and then some phenoxypropenoxide is incorporated therewith in order to impart to the product a permanent stabilization. The chlorination product thus obtained shows a relative viscosity of 10.5 if measured in a 10% solution (by volume) in chloroform.

The following table illustrates how the viscosity of the chlorination product is influenced by the amount of the regulator employed during the emulsion polymerization:

| Amount of regulator employed in the polymerization | Relative viscosity of the chlorinated product in a 10% solution (by volume) in chloroform |
| --- | --- |
| Percent | |
| 0.6 | 190 |
| 1.1 | 95 |
| 1.5 | 36 |

Example 2

A mixed polymerizate is prepared in the following manner:

75 parts of butadiene and
25 parts of styrene are emulsified in
150 parts of a 4% solution of sodium diisobutylnaphthalene sulfonate with the addition of
0.3 parts of ammonium persulfate and
1.8 parts of diisopropylxanthogen disulfide.

The resulting polymerization product is worked up and chlorinated as described in the foregoing example. The relative viscosity of the non-chlorinated product is 37, of the chlorinated product 13, these figures having been determined in a 10% solution (by volume) in chloroform. In case 0.8 or 1.5 parts of diisopropylxanthogen disulfide are employed for the polymerization, the relative viscosity of the chlorination product is 320 and 50 respectively.

Example 3

A mixed polymerizate is prepared as described in Example 2 with the exception that the ratio of butadiene: styrene is 70:30, that 200 parts of a 10% sodium oleate solution are employed for the preparation of the emulsion and that the diisopropylxanthogen disulfide is replaced by 4 parts of ditolyldisulfide. Isolation and chlorination is effected as described in Example 2. The chlorination product shows a relative viscosity of 22 in a 10% solution (by volume) in chloroform.

We claim:

1. The process which comprises chlorinating in solution in an indifferent solvent a synthetic rubber-like material obtained by the polymerization in aqueous emulsion of butadiene hydrocarbons in the presence of a polymerization inhibitor which effects an increase of plasticity and solubility of the polymerizate.

2. The process which comprises chlorinating in solution in an indifferent solvent a synthetic rubber-like material obtained by the polymerization in aqueous emulsion of butadiene hydrocarbons in the presence of such organic sulfur containing substances as are soluble in the monomeric butadiene hydrocarbon and effect an increase of plasticity and solubility of the polymerizate.

3. The process which comprises chlorinating in solution in an indifferent solvent a synthetic rubber-like material obtained by the polymerization in aqueous emulsion of butadiene hydrocarbons in the presence of diisopropylxanthogendisulfide.

4. The process which comprises chlorinating in solution in an indifferent solvent a synthetic rubber-like material obtained by the polymerization in aqueous emulsion of butadiene hydrocarbons in the presence of diisotolyldisulfide.

5. The process as claimed in claim 1 wherein the synthetic rubber-like material is a product of the conjoint emulsion polymerization of butadiene and styrene.

6. The process as claimed in claim 2 wherein the synthetic rubber-like material is a product of the conjoint emulsion polymerization of butadiene and styrene.

7. The process as claimed in claim 3 wherein the synthetic rubber-like material is a product of the conjoint emulsion polymerization of butadiene and styrene.

8. The process as claimed in claim 4 wherein the synthetic rubber-like material is a product of the conjoint emulsion polymerization of butadiene and styrene.

ALFRED BLÖMER.
WILHELM BECKER.